J. M. MACK.
TRANSMISSION MECHANISM.
APPLICATION FILED APR. 28, 1906.

954,531.

Patented Apr. 12, 1910.
6 SHEETS—SHEET 6.

WITNESSES:
Gustav Dieterich
Edwin H Dieterich

INVENTOR
John M. Mack
BY
Whaley & Hasbrouck
his ATTORNEYS

UNITED STATES PATENT OFFICE.

JOHN M. MACK, OF ALLENTOWN, PENNSYLVANIA.

TRANSMISSION MECHANISM.

954,531.

Specification of Letters Patent. Patented Apr. 12, 1910.

Application filed April 28, 1906. Serial No. 314,226.

*To all whom it may concern:*

Be it known that I, JOHN M. MACK, a citizen of the United States, residing at Allentown, Lehigh county, in the State of Pennsylvania, have invented certain new and useful Improvements in Transmission Mechanism, of which the following is a full, clear, and exact specification.

My invention relates to improvements in means for permitting a motor vehicle to travel at different rates of speed or in different directions, and the same has for its object more particularly to provide a simple, efficient and reliable apparatus in which, by means of a single operating lever so arranged as to be easily within reach and under control of the operator, the direction of the vehicle may be instantly changed from a forward to a reverse, or the speed of the vehicle changed from low speed to intermediate, or from intermediate to the high speed, and vice versa.

To the attainment of the aforesaid objects and ends, my invention consists in the novel details of construction, and in the combination, connection and arrangement of parts hereinafter more fully described, and then pointed out in the claims.

In the accompanying drawings forming part of this specification, wherein like numerals of reference indicate like parts, Figures 1 and 2 jointly show in plan view a transmission mechanism constructed according to and embodying my said invention, the gear case being shown with its cover removed, and the operating levers partly in section on the line 2—2 of Fig. 5.

In said drawings 15 designates a casing preferably made of metal, and consisting of a receptacle portion 16 adapted for securement to a vehicle frame, and a cover 17 adapted to be secured to said receptacle portion 16 by screws or bolts 18, 18 passing through the flanged edges of said receptacle portion and cover.

19 denotes a bearing or pillow-block arranged transversely within the receptacle portion 16 near its center and adapted to receive the ball bearings 20, 21, and in the front end of the receptacle portion 16 are supported ball bearings 23, 24, in line with the bearings 20, 21, respectively. Within the bearing 21 is revolubly mounted a gear wheel 25 having a hollow shaft 27 formed integral therewith; the said gear wheel has its face recessed and provided with an internal member $26^x$. The end of said shaft 27 is tapered at 28 and carries a bevel gear 29, and its extreme end 30 reduced in diameter and supported in a roller bearing 31 arranged in the receptacle 16.

32 denotes a nut disposed upon the threaded portion of the shaft 27 provided intermediate its reduced end 30 and tapered portion 28 which serves to hold the bevel gear 29 duly in position upon the shaft 27.

33 denotes the main or driving shaft having its inner portion stepped, and its extreme inner end supported in a roller bearing 34 arranged within the hollow shaft 27, and its adjoining portion disposed within a ball bearing 35 provided in the gear 25. The forward portion of the driving shaft 33 is supported in the roller bearing 24 in the front end of the casing, and its projecting end flexibly connected to the end of the engine shaft 36. The portion of the shaft 33 disposed within the casing 16 is partly composed of polygonal sections 37, 38 arranged intermediate the round portions of said shaft. Upon the section 37 is slidably disposed a clutch 39 having a portion 40 adapted to engage the internal clutch member $26^x$ of the high speed gear 25, and a portion 41 adapted to engage the integral clutch member 42 of the second speed gear 43 which is disposed upon the rounded portion of the shaft 33 intermediate the polygonal sections 37, 38. Adjoining said gear 43 is disposed a gear 44 having an internal clutch member 45 which is also free upon the shaft 33, and 46 denotes a double clutch which is slidably arranged upon the section 38 of the shaft 33, and the same comprises a clutch section 47 adapted to engage the internal clutch member 45, and a clutch section 48 adapted to engage the internal clutch member 49 of a gear 50 freely mounted upon the forward end of the shaft 33.

Upon the bottom of the casing at one of its sides are provided bearings 51, 51 within which is slidably supported a tubular rod 52 having fixed thereon intermediate the bearings 51, 51 a forked member 53 the ends of which embrace the clutch 46 intermediate the sections 47, 48 thereof, and to the side of said bearings 51, 51 is a bearing 54.

55 denotes a rod which extends through the tubular rod 52, and has its inner end supported in the bearing 54. Upon said rod 55 adjacent to its inner end is fixed a forked member 56 which embraces the clutch 39 intermediate the gears 40, 41 thereof, and below said forked member 56 and integral therewith is an inwardly projecting arm 57 having a depending pin 58 at its inner end.

60 denotes a gear wheel meshing directly with the gear 25 on the driving shaft 33 and provided with a hollow shaft or sleeve 61 which is mounted in the roller bearing 20. At the end of said hollow shaft or sleeve 61 is disposed a roller bearing 62, and the gear 60 further provided with an internal clutch member 63.

Within the casing and parallel with the main driving shaft 33 is arranged a jack-shaft 64 having fixed thereon, in the following order reading from right to left, a gear (reverse) 65 communicating with the gear 50 on the driving shaft 33 through the intermediate gear 66 fixed upon a shaft 67 supported in bearings 68, 69 provided within the casing below the driving shaft 33; a slow speed gear 70 meshing directly with the gear 44 on the driving shaft, and a gear 71 meshing directly with the gear 43 on the driving shaft 33.

The jack-shaft 64 is provided with a polygonal section 64ª intermediate the gears 60 and 71 upon which section is slidably arranged a clutch 72 having a clutch section 73 held normally in engagement with the internal clutch member 63 of the gear 60 by means of a spring 74 disposed about the jack-shaft 64 and bearing against the gear 71 and said clutch 72.

Figure 1:
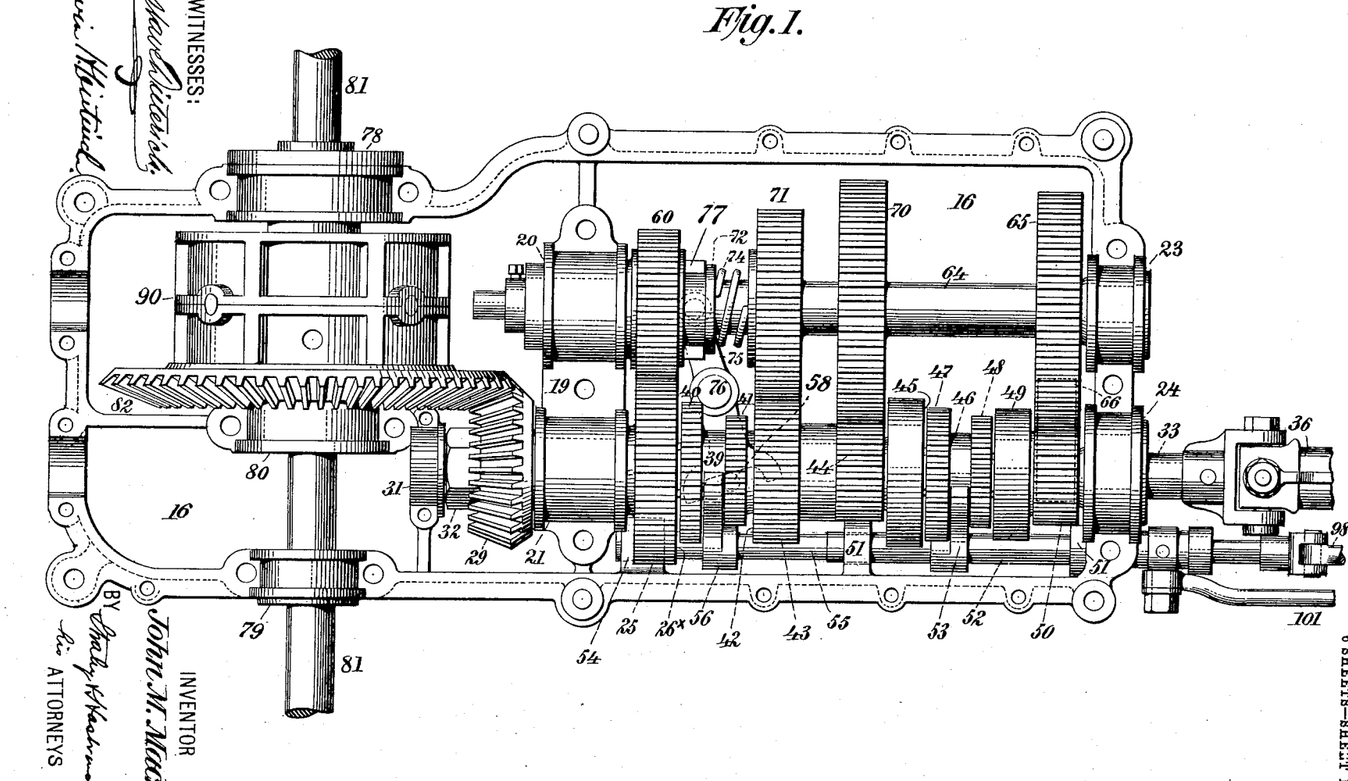
Figure 3:
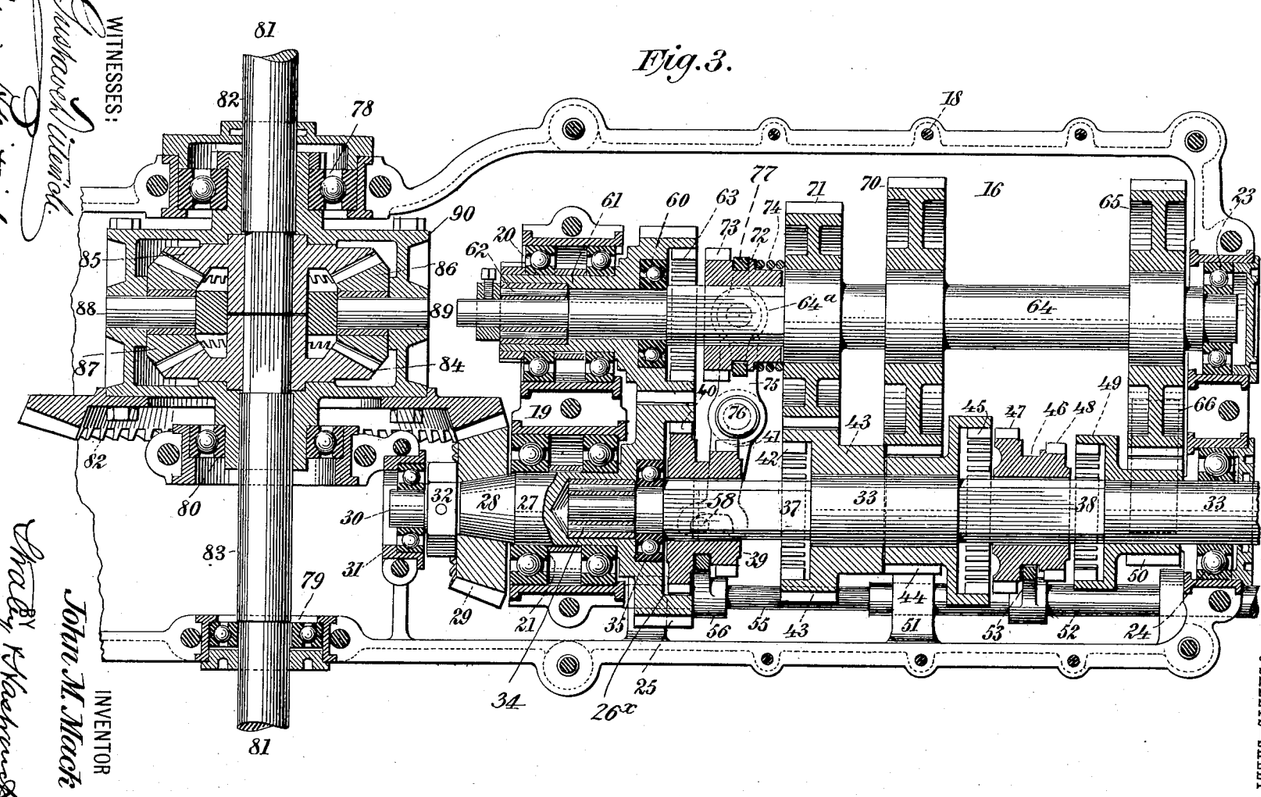
Fig. 3 is a view of the gear case with its cover removed, and showing the operating parts therein in section.
Figure 4:
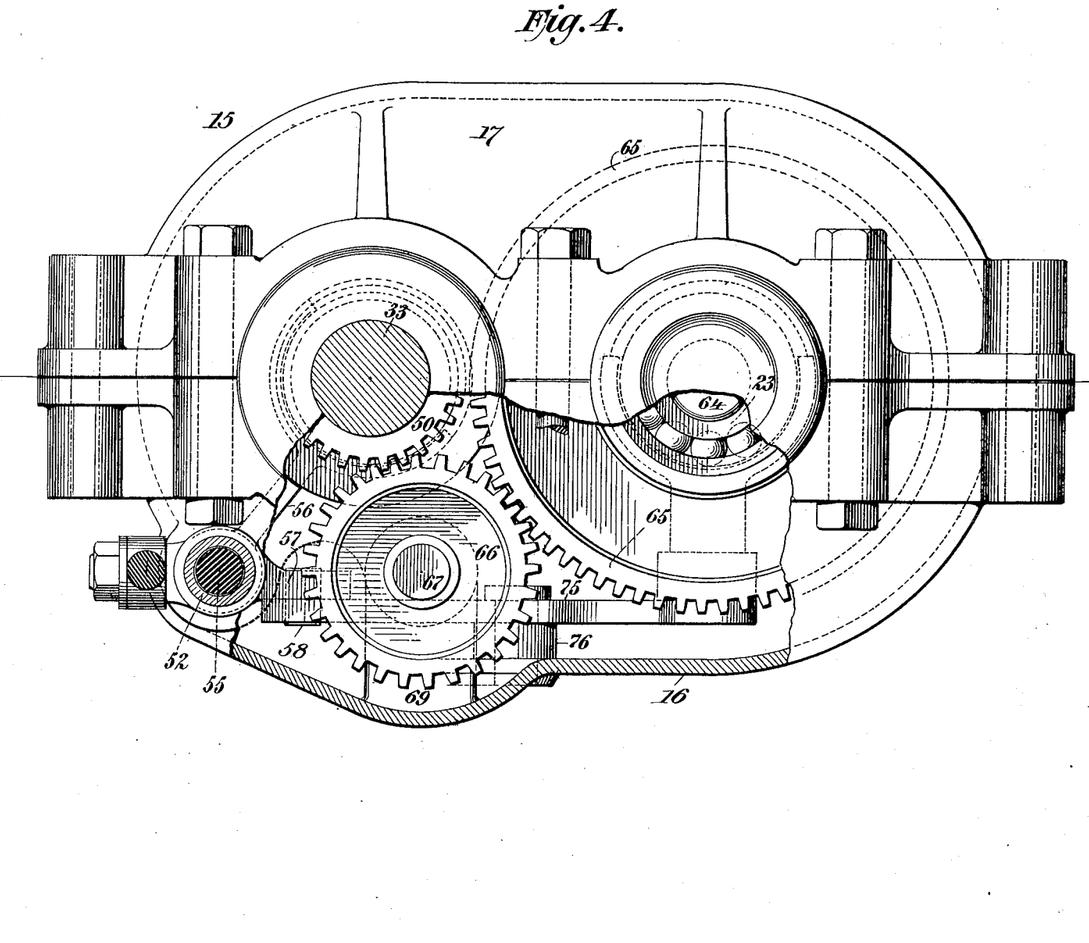
Fig. 4 is an end view of the casing partly broken away to show a portion of the interior mechanism.
Figure 5:
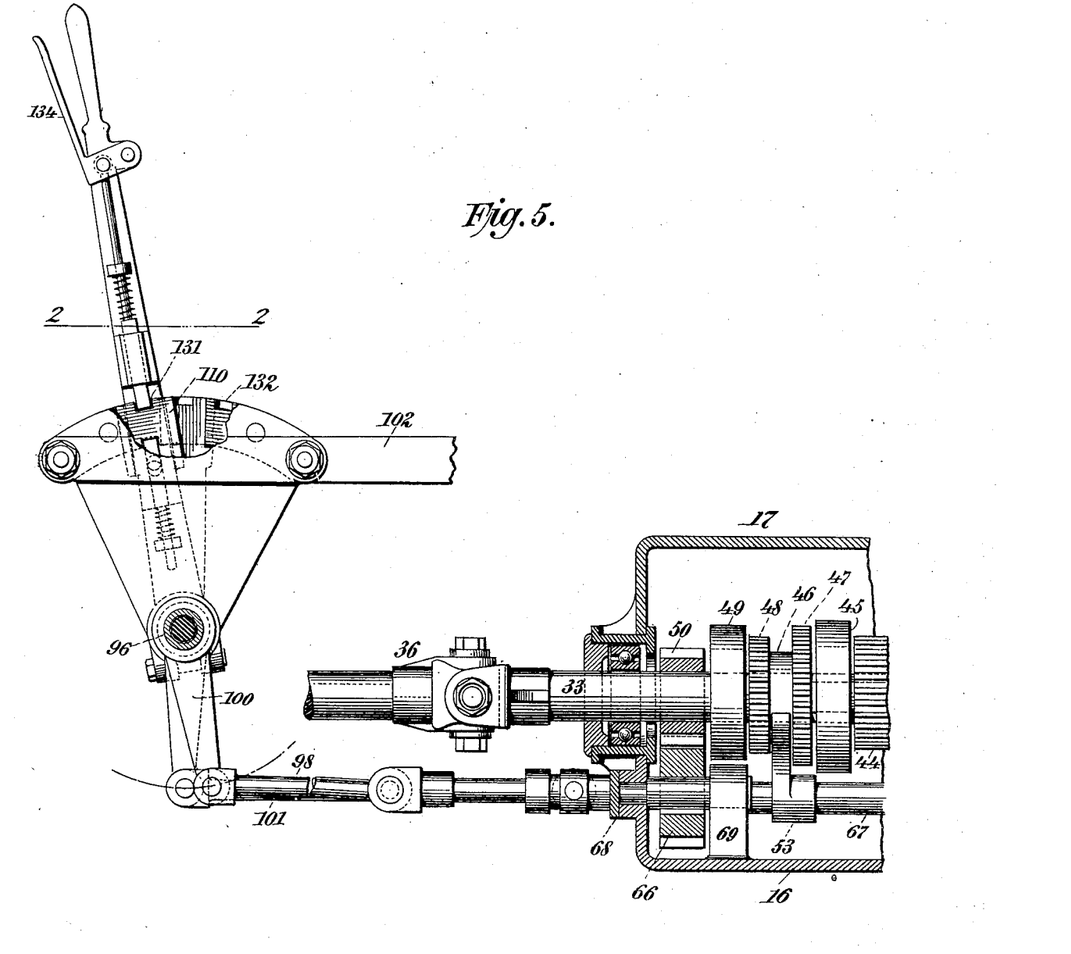
Fig. 5 is a section on the line 5—5 of Fig. 6, showing a portion of the gear case, and the operating lever in connection therewith.

75 denotes a lever which is pivotally mounted near its middle upon a bearing 76 arranged in the base of the casing between the driving shaft 33 and the jack-shaft 64. At the inner end of said lever is pivotally supported a forked member 77 which embraces the clutch 72 between the clutch section 73 and spring 74, and the forward end of said lever 75 is forked (as shown at Figs. 1 and 3) and adapted for engagement with the depending pin 58 on the arm 57 carried by the shifting rod 55.

In the sides of the casing near its left-hand end are provided ball bearings 78, 79, and within the casing about midway of the ball bearings 78, 79, is supported a third ball bearing 80.

81 denotes the counter-shaft which is composed of two sections 82, 83 having their inner ends squared and abutting against each other. Upon the inner abutting ends of said sections 82 83 are loosely fitted bevel gears 84, 85 meshing respectively with smaller bevel gears 86, 87 which are loosely fitted upon short shafts 88 89 suitably mounted in the casing 90 at right angles to the counter-shaft, the whole constituting an ordinary compensating gear. When no counter-shaft is employed, the rear axle of the vehicle may be constructed as above described.

95 denotes a shaft which is supported transversely upon the vehicle frame 102 in front of the forward end of the casing 16, and provided at its outer end with a head 95ª. Upon said shaft is disposed a sleeve 96 having fixed thereon an arm 97 which is pivotally secured at its lower end to a link 98 which is pivotally connected at its other end of the projecting end of the shifting rod 55 arranged in the casing 16. 99 denotes a second sleeve which is disposed upon the sleeve 96, and has fixed thereon an arm 100 arranged beside the arm 97. The lower end of said arm 100 is pivotally secured to a link 101 which is suitably connected at its rear end to the projecting portion of the tubular shifting rod 52.

Upon the side member of the frame 102 directly above the shaft 95 is bolted a segmental plate 103 having an aperture at its lower end forming a bearing for the sleeve 99, and the parts therein. At the upper edge of said plate 103 are provided guides 104, 105, 106 which are secured to said plate 103 and maintained duly separated by sleeve sections 107 arranged intermediate said guides 104, 105, 106 upon the bolts 108, 108 and adjacent to the bolts 108, 108 are provided transverse bolts forming stops 109ª, 109ᵇ, 109ᶜ, 109ᵈ. Upon the outer end of the sleeve 99 is fixed the lower end of a supplemental lever 110 arranged in line with the arm 100 on said sleeve. The upper end of said supplemental lever 110 is provided along its vertical edges with inwardly projecting portions 111, 111, and intermediate the same with a longitudinal slot 112. Upon the outer end of the sleeve 96 is fixed the lower end of a second supplemental lever 113 corresponding to the lever 110, and in line with the arm 97 on said sleeve 96. The upper end of said supplemental lever 113 is also provided with inwardly projecting portions 114, 114 and intermediate the same with a longitudinal slot 115. Upon the outer surfaces of said supplemental levers 110, 113 are arranged bearings 116, 116 within which are disposed the stems 117 of bolts 118 118 provided upon their inner opposing surfaces with studs 119 119, adapted to extend into the longitudinal slots 112, 115 in the levers 110, 113 respectively.

120, 120 denote springs disposed about the stems 116 intermediate the bearings 116, 116 and the bolts 118, 118 whereby to hold the latter normally projected and the ends thereof within the recesses 121, 121 in the undersides of the guide plates 104, 106. The bolt 118 of the supplemental lever 110 being held in position by the plate 103 and the bolt 118 of the supplemental lever 113 by a guide 122 secured upon the outer surface of said lever 113.

123 denotes a collar loosely disposed upon the sleeve 96 between the fixed ends of the supplemental levers 110, 113, provided with a depending portion 124, and 125 denotes an operating lever having its lower end bifurcated, and embracing the collar 123, and the ends of said bifurcated portion pivotally secured to the depending portion 124 of the collar 123, whereby to permit of said lever being rotated upon the sleeve 96, and also oscillated thereon in a direction parallel with said sleeve 96 and shaft 95 therein. The operating lever 125 is provided upon its opposite sides above the guide plates 104, 105, 106 with bearings or guides 126, 126 within which work rods 127, 127 having bolts 128 128 secured to their lower ends working in guides 129, 129 and springs 130, 130 disposed upon said rods intermediate said bolts 128 128 and bearings 126, 126.

When the operating lever 125 is shifted into engagement with one of the supplemental levers 110, 113 one of the bolts 128 on the side of the operating lever will engage either of the recesses 132 or 133 provided in the upper edge of the middle guide plate 105, and thereby hold the operating lever 125 and either of the supplemental levers 110, 113 which happens to be in engagement therewith jointly locked to their adjusted position.

Upon the upper end of the operating lever 125 is pivotally secured the bifurcated end of a lever 134 to the portions of which at each side of the operating lever 125 are pivotally secured the upper ends of the rods 127, 127 of the bolts 128, 128.

Upon the portion of the operating lever 125 opposite to the recesses 112, 115 in the supplemental levers 110 113 are provided outwardly projecting studs 135, 135 having their ends beveled downward and inward to form cams adapted to engage the studs 119, 119 of the bolts 118, 118, when the operating lever 125 is oscillated in either direction.

Figure 2:
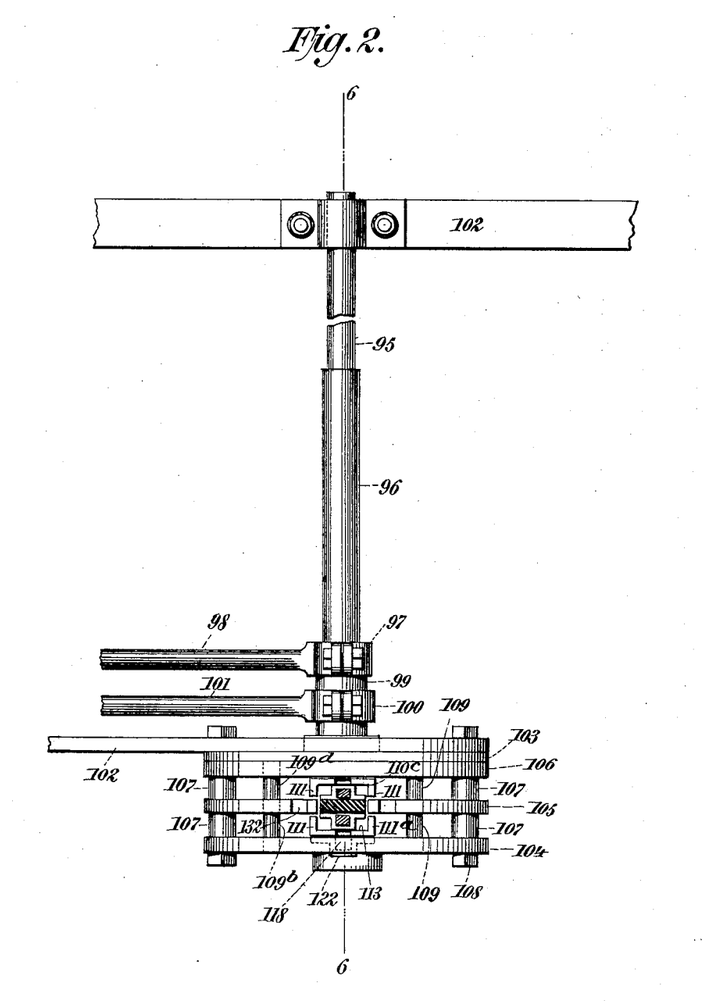
Figures 6, 7:
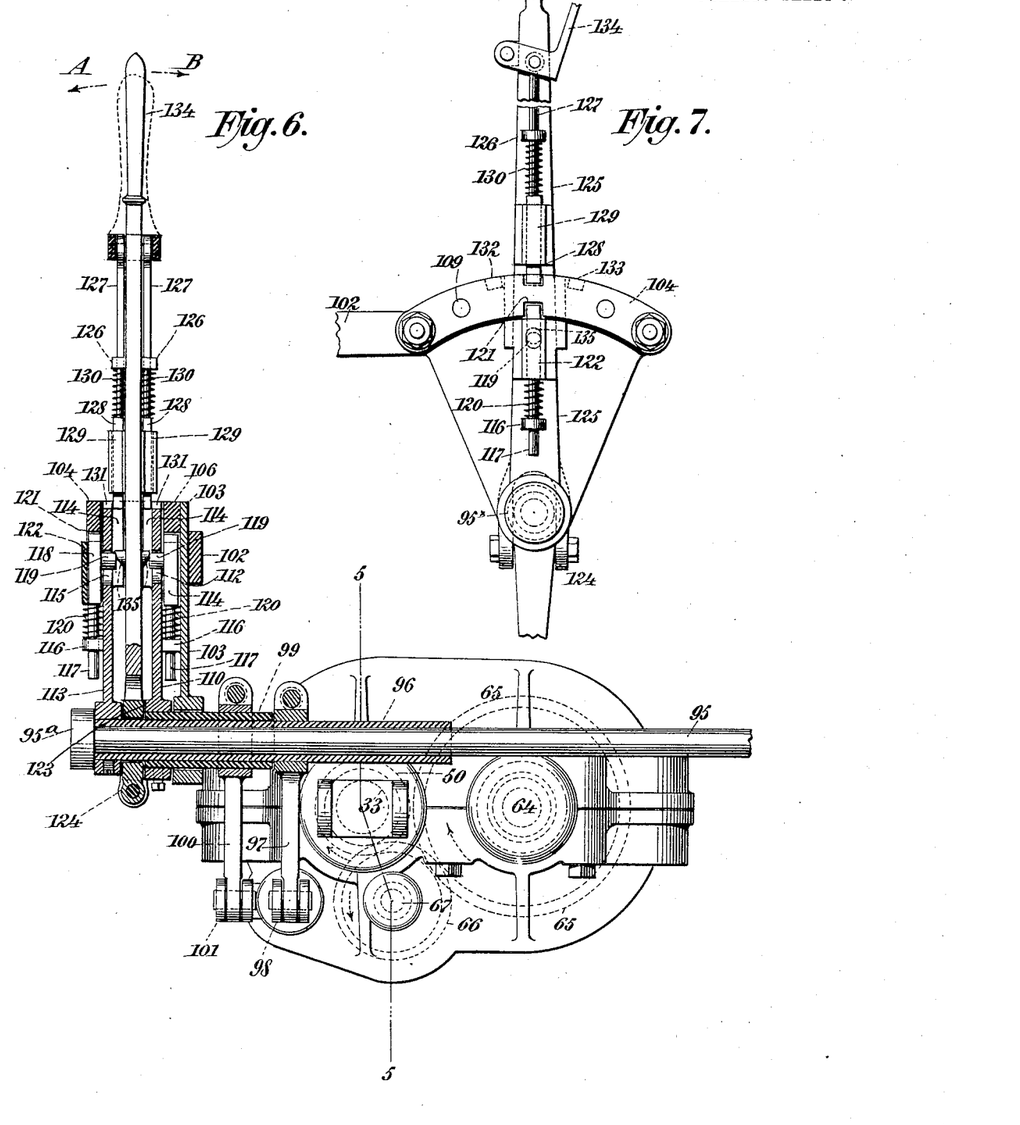
Fig. 6 is a front end view of the gear casing, and the operating lever and intermediate mechanism shown in section.
Fig. 7 is a detail side view of operating lever, showing the locking device therefor.

The operation of the apparatus is as follows: When the operating lever 125 is in the neutral position as indicated at Figs. 2, 6 and 7, the parts within the casing will be in the positions indicated at Fig. 1—that is to say, all the clutches will be out of engagement with their respective gears except the clutch 72, the portion 73 of which will be in engagement with the internal clutch member 63 of the gear 60. In this position and arrangement the driving shaft 33, and the jack-shaft 64 are free to rotate without communicating motion to the counter-shaft 81. When the operating lever 125 is thrown outward in the direction of the arrow A (Fig. 6) it will engage the supplemental lever 113 intermediate the portions 114, 114 thereof, and at the same time the cam stud 135 will engage the stud 119 of the bolt 118 on the supplemental lever 113 and depress said bolt and release its upper end of its engagement with the recess 121 in the lever edge of the guide plate 104. As soon as the bolt 118 of the supplemental lever 113 has been released the operating lever 125 and said supplemental lever 113 may be jointly moved forward or backward between the guide plates 104 and 105 and be jointly locked to the shifted positions by the engagement of the bolt 128 on the inner side of the lever 125 with either of the recesses 132, 133 in the upper edge of the middle guide plate 105. By shifting the operating lever 125 and the supplemental lever 113 forward against the portion of the stop 109$^a$, the shifting rod 55 will be forced inward by the arm 97 and link 98, and cause the arm 57 on said rod 55 to shift the lever 75, release the portion 73 of the clutch 72 of its engagement with the internal clutch member 63, and at the same time through the medium of the forked member 56 carried by the rod 55 shift the clutch 39, and cause the clutch part 40 thereof to engage the internal clutch member 26$^x$ of the high speed gear 25, and cause the shaft 28, bevel gear 29 to rotate directly through the driving shaft 33, and communicate motion to the counter-shaft 81 through the large bevel gear 82 on said counter-shaft. By shifting the operating lever 125 and supplemental lever 113 backward and against the stop 109$^b$ the shifting rod 55 will be drawn outward by the arm 97 and link 98 and cause the gear 41 of the clutch 39 to engage the internal clutch member 42 of the second speed gear 43 and lock the same upon the driving shaft 33, and at the same time shift the lever 75 and permit the clutch 72 to engage the internal clutch member of the gear 60. In this position motion will be transmitted from the driving shaft 33 through the gear 43, gear 71 on the jack-shaft 64, gears 60, 25 and bevel gear 29 to the bevel gear 82 on the counter-shaft. In order to bring the slow speed gear 16 and the reverse gear 65 into operation the operating lever 125 and supplemental lever 113 must first be unlocked by means of the lever 134 and rod 127, and said levers then returned to the neutral position, when the operating lever 125 may be disengaged from the supplemental lever 113, and the latter locked to said position by means of its bolt 118 engaging the recess 121 in the guide plate 104. By throwing the operating lever 125 inward (in the direction of the arrow B Fig. 6) the same will engage the supplemental lever 110 and release the bolt 118 thereof through the contact of the cam stud 135 with the stud 119 of the bolt 118 carried by said supplemental lever 110, and thus permit the operating lever 125, and supplemental lever 110 to be jointly actuated. By shifting said lever 125 and supplemental lever 110 forward against the stop 109ᶜ the sleeve 99 and arm 100 will be partially rotated and the tubular rod 52 moved inward through the link 101 without disturbing the shifting rod 55; cause the forked member 53 carried by said tubular rod 52 to move the part 47 of the clutch 46 into engagement with the internal clutch member 45 and lock the gear 44 connected thereto upon the driving shaft 33. Hereupon motion will be transmitted from the driving shaft 33 to the counter-shaft 81 through the gear 44 slow speed gear 70 on the jack-shaft 64, gears 60, 25 and bevel gears 29 and 82. After releasing the locking bolt 128 of its engagement with the recess 133 by means of the lever 134 and the rod 127 the operating lever 125 may be shifted again, and when adjusted to contact with the stop 109ᵈ, the tubular shifting rod 52 will be drawn outward by the link 101 and arm 100 and the gear 48 of the clutch 46 thrown into engagement with the internal clutch member 49 and thereby lock the gear 50 connected thereto to the driving shaft 33. Hereupon a reverse movement will be transmitted to the counter shaft 81 through the gear 50, reverse gear 65 on the jack-shaft 64, gears 60 and 25, and bevel gears 29 and 82. The supplemental lever 110 and the operating lever 125 are jointly locked to their forward positions by the engagement of the left-hand bolt 128 (as seen at Fig. 6) with the recess 133 in the middle guide plate 105, and to the rearward position by the engagement of the same bolt with the recess 132 in the said guide plate 105.

I do not claim herein the construction of the levers and their coöperating parts for actuating the transmission mechanism, as the same forms the subject matter of a divisional application, filed March 7th, 1910, Serial No. 547,733.

Having thus described my invention, what I claim and desire to secure by Letters Patent is:

1. In a transmission mechanism, the combination with a driving shaft, of a jack-shaft, a series of gears fixed thereon, gears arranged at the end of said driving shaft, and said jack-shaft meshing with each other, a bevel gear adapted to rotate with the gear of the driving shaft, a counter-shaft, a bevel gear thereon in mesh with the bevel gear aforesaid, a clutch on said jack-shaft normally engaging the gear arranged at the end thereof, a series of gears loosely mounted upon said driving shaft in mesh with the gears fixed upon the jack-shaft, clutches arranged upon said driving shaft, and means for releasing the clutch of the jack-shaft as one of the clutches on the driving shaft is shifted into operative position, and engaging the clutch of the jack shaft as the remaining clutches of the driving shaft are severally shifted into operative position, substantially as specified.

2. In a transmission mechanism, the combination with a driving shaft, of a jack-shaft, a series of gears fixed thereon, gears arranged at the ends of said driving shaft and jack-shaft in mesh with each other, a bevel gear adapted to rotate with the gear of the driving shaft, a counter-shaft, a bevel gear thereon in mesh with the bevel gear aforesaid, a clutch on said jack-shaft normally engaging the gear arranged at the end thereof, a series of gears loosely mounted upon said driving shaft in mesh with the gears fixed upon the jack-shaft, clutches arranged upon said driving shaft, means for releasing the clutch of the gear at the end of the jack-shaft, and actuating one of the clutches of the driving shaft to engage the gear at the end of said driving shaft, and means for actuating the clutch of the jack-shaft to engage its gear and the remainder of the clutches on said driving shaft to severally engage their respective gears, substantially as specified.

3. In a transmission mechanism, the combination with a driving shaft composed of two parts, a gear and a bevel gear fixed on one of said parts, and a series of gears and clutches on the other of said parts adapted for engagement with said gears, a jack-shaft, a gear at its end meshing with the gear on the part of the driving shaft first mentioned, a clutch on said jack-shaft adapted normally to engage the gear at the end thereof, and a series of gears meshing with those on the part of the driving shaft last mentioned, a counter-shaft, a bevel gear thereon in mesh with the bevel gear of the driving shaft, means for releasing the clutch of the jack-shaft from the gear at the end thereof and actuating one of the clutches on the driving shaft to engage the gear upon the part thereof first mentioned, and means for actuating the clutch of the jack-shaft to engage its gear and the remainder of the clutches on the driving shaft to severally engage their respective gears, substantially as specified.

4. In a transmission mechanism, the combination with a driving shaft composed of two parts fitted to each other, a gear and a bevel gear fixed on one of said parts, a series of gears loosely mounted upon the other of said parts provided with internal clutch members, and two sets of clutches adapted to engage said internal clutch members, a jack-shaft composed of two parts fitted to each other, a gear wheel provided with an internal clutch member on one of said parts meshing with the gear wheel on the corresponding part of the driving shaft, a clutch on said jack-shaft adapted normally to engage the internal clutch member at one end thereof, a series of gears fixed on the other part of said jack-shaft meshing with the loose gears on the driving shaft, a counter-shaft, a bevel gear thereon in mesh with the bevel gear of the driving shaft, means for releasing the clutch of the jack-shaft from the gear at the end thereof, and actuating one set of clutches of the driving shaft to engage either of its gears, and means for actuating the other set of clutches to engage either of its gears, substantially as specified.

5. In a transmission mechanism, the combination with a driving shaft composed of a solid part, and a hollow part fitted upon one end thereof, a gear fixed at one end of said hollow part, a bevel gear fixed at the other end of said hollow part and a series of gears loosely mounted on said solid part and provided with clutch members, a plurality of clutches disposed upon said solid part and adapted to engage the clutch members thereon, a jack-shaft composed of a solid part and a hollow part fitted upon one end thereof, a gear wheel provided with a clutch member fixed upon said hollow part, and meshing with the gear upon the hollow part of the driving shaft, a clutch on said jack-shaft normally in engagement with the clutch member on the hollow part thereof, a series of gears upon the solid part of said jack-shaft meshing with the loose gears upon the solid part of the driving shaft, a counter-shaft, a bevel gear fixed thereon meshing with the one on the hollow part of the driving shaft, means for releasing the clutch on the jack-shaft from the clutch member upon the hollow portion of said jack-shaft, and actuating one of said clutches to engage either of its clutch members, and means for actuating the other of said clutches to engage either of its clutch members, substantially as specified.

6. In a transmission mechanism, the combination with a driving shaft composed of a solid part, and a hollow part fitted upon one end thereof, a gear fixed at one end of said hollow part, a bevel gear, fixed at the other end of said hollow part, a series of gears loosely mounted upon said solid part and provided with internal clutch members, a plurality of clutches slidably disposed upon said part intermediate said gears each comprising two clutch sections adapted to engage said internal clutch members, a jack-shaft arranged parallel with said driving shaft composed of a solid part and a hollow part fitted upon one end thereof, a gear having an internal clutch member and meshing with the gear upon the hollow part of the driving shaft, a clutch slidably disposed upon the solid portion of said jack-shaft, a spring for holding said clutch normally in engagement with said internal clutch member on said hollow part, a lever having one end in engagement with said clutch, a series of gears fixed on the solid part of said jack-shaft meshing with the loose gears on the solid part of the driving shaft, a counter-shaft, a bevel gear thereon in mesh with the bevel gear on the hollow part of the driving shaft, and means for actuating said clutches comprising a pair of slidable rods; one of said rods being operatively connected to one of the clutches on the driving shaft, and the lever actuating the clutch on the jack-shaft, and the other of said rods operatively connected with the other of said clutches on said driving shaft, substantially as specified.

Signed at city of New York in the county of New York in the State of New York, this twenty-sixth day of April, nineteen hundred and six.

JOHN M. MACK.

Witnesses:
 CONRAD A. DIETERICH,
 JAMES J. DONOHUE.